(No Model.)
A. WAREHAM.
ODOMETER.
No. 441,520. Patented Nov. 25, 1890.
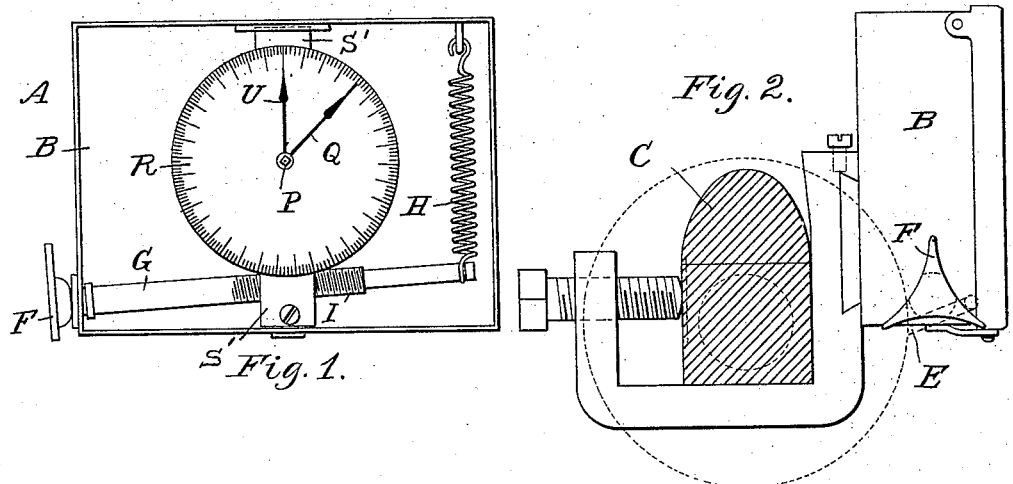
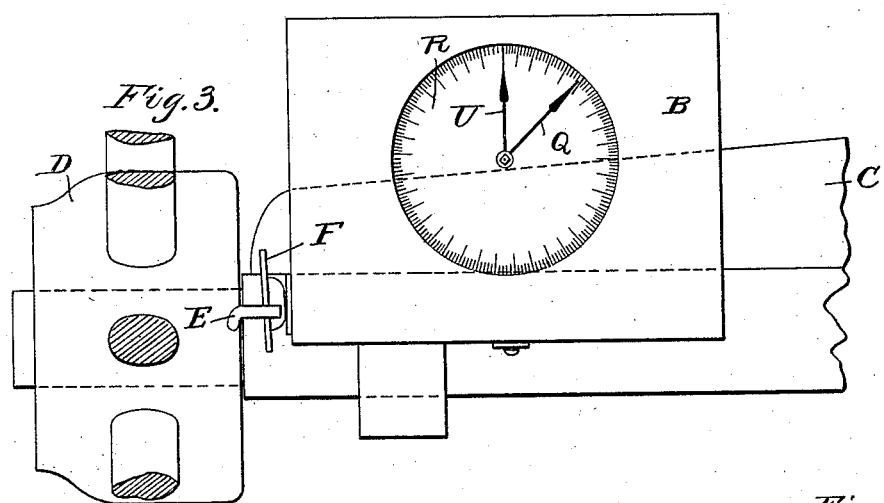
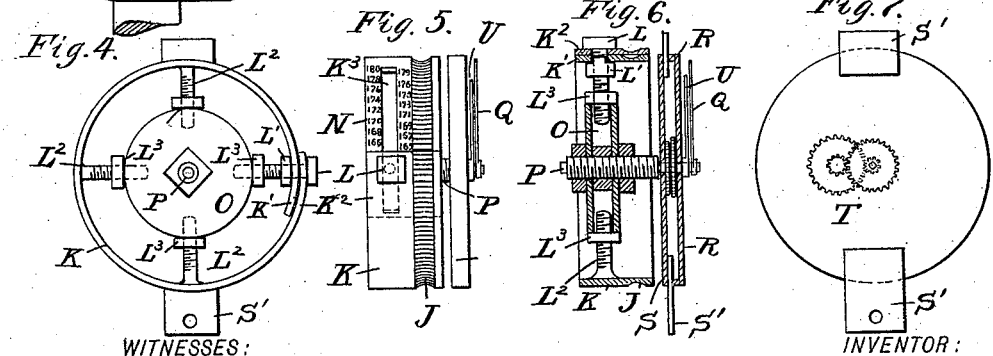
WITNESSES:
INVENTOR: A. Wareham
BY Munn & Co.
ATTORNEYS

UNITED STATES PATENT OFFICE.

ALBERT WAREHAM, OF WEST CHARLTON, NEW YORK.

ODOMETER.

SPECIFICATION forming part of Letters Patent No. 441,520, dated November 25, 1890.

Application filed June 30, 1890. Serial No. 357,265. (No model.)

*To all whom it may concern:*

Be it known that I, ALBERT WAREHAM, of West Charlton, in the county of Saratoga and State of New York, have invented a new and Improved Odometer, of which the following is a full, clear, and exact description.

The object of the invention is to provide a new and improved odometer which is simple and durable in construction, can be readily applied to any vehicle, and is quickly adjustable according to the size of the wheel the revolutions of which are to be measured.

The invention consists of a split worm-wheel having overlapping ends, to permit of increasing or diminishing the size of the wheel according to the size of the vehicle-wheel.

The invention also consists in certain parts and details and combinations of the same, as will be described hereinafter, and then pointed out in the claims.

Reference is to be had to the accompanying drawings, forming a part of this specification, in which similar letters of reference indicate corresponding parts in all the figures.

Figure 1 is a face view of the improvement with the cover removed. Fig. 2 is a side elevation of the same as applied, the axle being shown in section. Fig. 3 is a face view of the improvement as applied. Fig. 4 is a rear face view of the works proper. Fig. 5 is a side elevation of the same. Fig. 6 is a transverse section of the same, and Fig. 7 is a front face view of the same with the dial and the hands removed.

The improved odometer A is provided with a suitably-constructed casing B, fastened by suitable means to the rear axle C of the vehicle, the travel of which is to be measured. The casing B is located near one end of the axle in close proximity to one of the rear wheels D, the hub of which carries an L-shaped arm E, adapted to engage a triangular wheel F, secured on the shaft G, mounted to turn loosely at one end in a bearing in the casing B and having its inner end extending into the casing B, connected with a spring H. (See Fig. 1.) The wheel D and its arm E are arranged in such a manner in relation to the triangular wheel F that the latter is turned so as to turn the shaft G the distance of one-third of a revolution for every revolution of the vehicle-wheel. It is understood that a wheel F with more than three teeth can be employed, if desired.

On the shaft G is formed a worm I in mesh with worm-teeth J, formed on a wheel K, arranged inside of the casing B, which wheel K is split, so that its ends K' and K² overlap each other, as is plainly illustrated in Figs. 4, 5, and 6. In the outer overlapping end K² of the wheel K is held a bolt L, passing through a slot K³ formed in the other or inner end K', the said bolt being provided with a nut L', adapted to screw against the inside of the inner end K', to fasten the latter to the outer overlapping end K². By the operator pressing on the rim of the wheel K when the nut L' is loosened the ends K' and K² may be lapped more or less, according to the size of the wheel D of the vehicle on which the odometer is applied. The overlapping end K² is adapted to indicate on graduations N, arranged on each side of the slot K³, the said graduation representing the various circumferences in inches of vehicle-wheels. The wheel K is also provided with spokes L² made in the shape of bolts, similar to the bolt L and extending inward onto a hub O, which is adapted to support the wheel or rim K by adjusting-nuts L³ on the said threaded spokes L², the said nuts engaging the periphery of the hub, as is plainly shown in Figs. 4 and 6. The hub O is fastened on a spindle P and carries at its front end a hand Q, adapted to indicate on the dial R, secured on a casing S, provided with lugs S', for securing the said casing in the main casing B. The spindle P is mounted to revolve in the said casing S, which latter also contains the usual train of gear-wheels T, actuated from the spindle P and adapted to operate the hand U, mounted to turn loosely on the spindle P, and also indicating on the dial R. The gearing T is so arranged that the hand U indicates from one to twenty or more miles, while the other hand Q indicates one mile and the half, quarter, and other parts of a mile.

The operation is as follows: When the operator desires to apply an odometer on his vehicle, he first measures the circumference of the rear wheel and then loosens the nuts L' and L³ in the odometer and adjusts the overlapping ends K' and K² until the edge of the end K² indicates on the graduation N the circumference of the vehicle-wheel. As shown in Fig. 5, the wheel K is set for a vehicle-wheel of one hundred and sixty-five inches in circumference. As soon as the wheel K has been adjusted by its overlapping ends K' and K², as described, then the nuts L' and L³ are screwed up so as to hold the overlapping ends K' and K² in place to prevent change of the diameter of the wheel K. At the same time the wheel K is held on the hub O by the nuts L³. The casing B is then secured on the axle C by a clip or other suitable means, and the hub of the wheel D is provided with the pin E, so that at every revolution of the wheel D the said pin E imparts one-third of a revolution to the shaft G, which, by its worm-wheel I meshing in the worm J by the force of the spring H, rotates the wheel K, secured on the spindle P, so that the latter indicates, by means of its hands Q and U, the number of revolutions the wheel D has made, and the graduation on the dial R may also be arranged so as to indicate at once the distance in feet or other measurement that the vehicle has traveled. It will be seen that by having the wheel K adjustable to any sized vehicle-wheel the device is readily applicable to all vehicles. It is understood that the worm-teeth J at the overlapping ends K' and K² of the wheel K do not interfere with the working of the device, as the worm I compensates for the overlapping of the ends K' and K², as the shaft G is free to swing, being yieldingly mounted in the casing B. The latter is preferably provided with a hinged cover having a glass front, so that the hands Q and U can be readily seen at any time from the outside.

Having thus described my invention, what I claim as new, and desire to secure by Letters Patent, is—

1. In an odometer, a split worm-wheel having overlapping ends adapted to be secured to each other, to increase or diminish the size of the wheel, according to the size of the vehicle-wheel on which the odometer is used, substantially as shown and described.

2. In an odometer, the combination, with a yieldingly-mounted worm actuated from the vehicle-wheel, of a split worm-wheel in mesh with the said worm and having overlapping ends adapted to be secured to each other, substantially as shown and described.

3. In an odometer, the combination, with a yieldingly-mounted worm actuated from the vehicle-wheel, of a split worm-wheel in mesh with the said worm and having overlapping ends adapted to be secured to each other and means for indicating the revolutions of the said worm-wheel, as set forth.

4. In an odometer, the combination, with a casing and a worm-shaft mounted yieldingly therein, and adapted to be actuated by the vehicle-wheel, of a split worm-wheel in mesh with the worm on the said worm-shaft and having overlapping ends adapted to be secured to each other and permitting of increasing or diminishing the size of the worm-wheel, substantially as shown and described.

5. In an odometer, the combination, with a casing and a worm-shaft mounted yieldingly therein and adapted to be actuated by the vehicle-wheel, of a split worm-wheel in mesh with the worm on the said worm-shaft and having overlapping ends adapted to be secured to each other and permitting of increasing or diminishing the size of the worm-wheel, a spindle carrying the said worm-wheel, and an indicator connected with the said spindle, substantially as shown and described.

6. In an odometer, a split worm-wheel having overlapping ends adapted to be fastened together, and of which one end is provided with a graduation, substantially as shown and described.

7. In an odometer, a wheel comprising a split rim, the ends of which overlap each other, a bolt for fastening the overlapping ends together, bolts projecting from the said rim, and a hub adapted to be connected with the said bolts, substantially as shown and described.

8. In an odometer, a wheel comprising a split-rim, the ends of which overlap each other, a bolt for fastening the overlapping ends together, bolts projecting from the said rim, a hub adapted to be connected with the said bolts, and a graduation arranged on one of the overlapping ends, substantially as shown and described.

ALBERT WAREHAM.

Witnesses:
 JOHN A. PALMER,
 JAMES YELVERTON.